United States Patent [19]
Hock

[11] Patent Number: 5,486,835
[45] Date of Patent: Jan. 23, 1996

[54] LOW COST TELEMETRY RECEIVING SYSTEM

[75] Inventor: Terrence F. Hock, Golden, Colo.

[73] Assignee: University Corporation For Atmospheric Research, Boulder, Colo.

[21] Appl. No.: 331,808

[22] Filed: Oct. 31, 1994

[51] Int. Cl.$^6$ ........................................ H01Q 3/00
[52] U.S. Cl. .............................. 342/359; 342/50
[58] Field of Search ............... 342/359, 50; 343/700 MS

[56] References Cited

U.S. PATENT DOCUMENTS

| | | | |
|---|---|---|---|
| 4,060,803 | 11/1977 | Baghdady | 343/112 R |
| 4,162,499 | 7/1979 | Jones et al. | 343/700 MS |
| 5,061,936 | 10/1991 | Suzuki | 342/359 |
| 5,073,783 | 12/1991 | Uematsu et al. | 342/353 |

*Primary Examiner*—Thomas H. Tarcza
*Assistant Examiner*—Dao L. Pham
*Attorney, Agent, or Firm*—Duft, Graziano & Forest

[57] ABSTRACT

A low cost telemetry receiving system for use with an atmospheric sounding device includes an antenna configuration mounted on an azimuthally rotatable platform. The antennas have an asymmetrically shaped receiving beam having a narrow azimuth and wide elevation. The wide elevation is fixed due to a first antenna being oriented zenithally, and a second antenna being oriented horizontally. Rotating an azimuthally rotatable platform facilitates full canopy coverage for receiving telemetry. Determining when to reposition the rotatable platform is accomplished by sensing the strength of telemetry signal by rapidly sequencing the receiving beam so that it sweeps azimuthally within the narrow azimuthal view of the antenna. The platform rotates in the direction the signal is strongest. Because the antenna is a receive only antenna with one mechanical part, and the antenna is constructed with microstrip patch array technology, the overall antenna system is inexpensive and highly reliable for use in receiving telemetry from wandering atmospheric sounding devices.

14 Claims, 3 Drawing Sheets

LOW COST TELEMETRY RECEIVING SYSTEM

CROSS REFERENCE TO RELATED APPLICATIONS

The following applications titled "FACILITY FOR PREPARING AND DEPLOYING SOUNDING DEVICES" and "INTEGRATED CONTROL SYSTEM FOR PREPARING AND DEPLOYING SOUNDING DEVICES AND MANAGING TELEMETRY THEREFROM" are related to the present application and were each filed on Oct. 31, 1994.

FIELD OF THE INVENTION

This invention relates to a low cost telemetry receiving system and, in particular, to a passive, inexpensive antenna system that uses shaped receiving beam to receive telemetry signals from a local wandering airborne transmitter.

PROBLEM

It is a problem in telemetry receiving systems to implement an inexpensive system to receive atmospheric telemetry from a local wandering airborne transmitter in the lower atmosphere. Atmospheric soundings are traditionally accomplished by deploying a sounding device that is carried by prevailing winds at a passively controlled rate of ascent and/or decent. Among the vehicles used to deploy a sounding device are balloons, parachutes, gliders, other unmanned aircraft, or any combination of the above. Telemetry from a deployed sounding device is continually transmitted as the sounding device traverses the atmosphere. Telemetry is received by a local ground or air based receiving antenna. Key to receiving the telemetry, however, is the ability to continually receive the transmission from the sounding device until the device is beyond transmitting range.

Existing telemetry receiving systems that are used to receive from sounding devices, pinpoint the actual location of the sounding device as a target in three-dimensional space using high gain radar style dish antennas that produce a broad symmetrical receiving beam over a large area of space. The dish antennas facilitate locating and tracking a target by moving the antenna dish along the full range of azimuth and elevation being searched, and determining the location of the transmitter in three-dimensional space. While this approach maintains continuous reception from the sounding device, the system is too costly and more precise than the application requires, given that the antenna tracks the sounding device by locating and following the device's position in three-dimensional space.

SOLUTION

The above described problems are solved and a technical advance achieved in the field by the low cost telemetry receiving system. The present invention includes an antenna system that comprises multiple high gain vertically polarized antennas mounted on an azimuthally rotatable platform. The antenna system has an asymmetrically shaped receiving beam having a narrow azimuth and wide elevation. The wide elevation is fixed due to a first antenna in the antenna system being oriented zenithally, and a second antenna in the antenna system being oriented horizontally. Rotating an azimuthally rotatable platform facilitates full canopy coverage for receiving telemetry. Determining when to reposition the rotatable platform is accomplished by sensing the strength of the received telemetry signal by rapidly sequencing the receiving beam so that it sweeps azimuthally within the narrow azimuthal view of the antenna. The platform rotates in the direction the signal is strongest. Because the antenna system is a receive only antenna with one mechanical part, and the individual antennas are constructed with microstrip patch array technology, the overall antenna system is inexpensive and highly reliable for use in receiving telemetry from wandering atmospheric sounding devices.

DETAILED DESCRIPTION

Telemetry Receiving System

Figure 1:
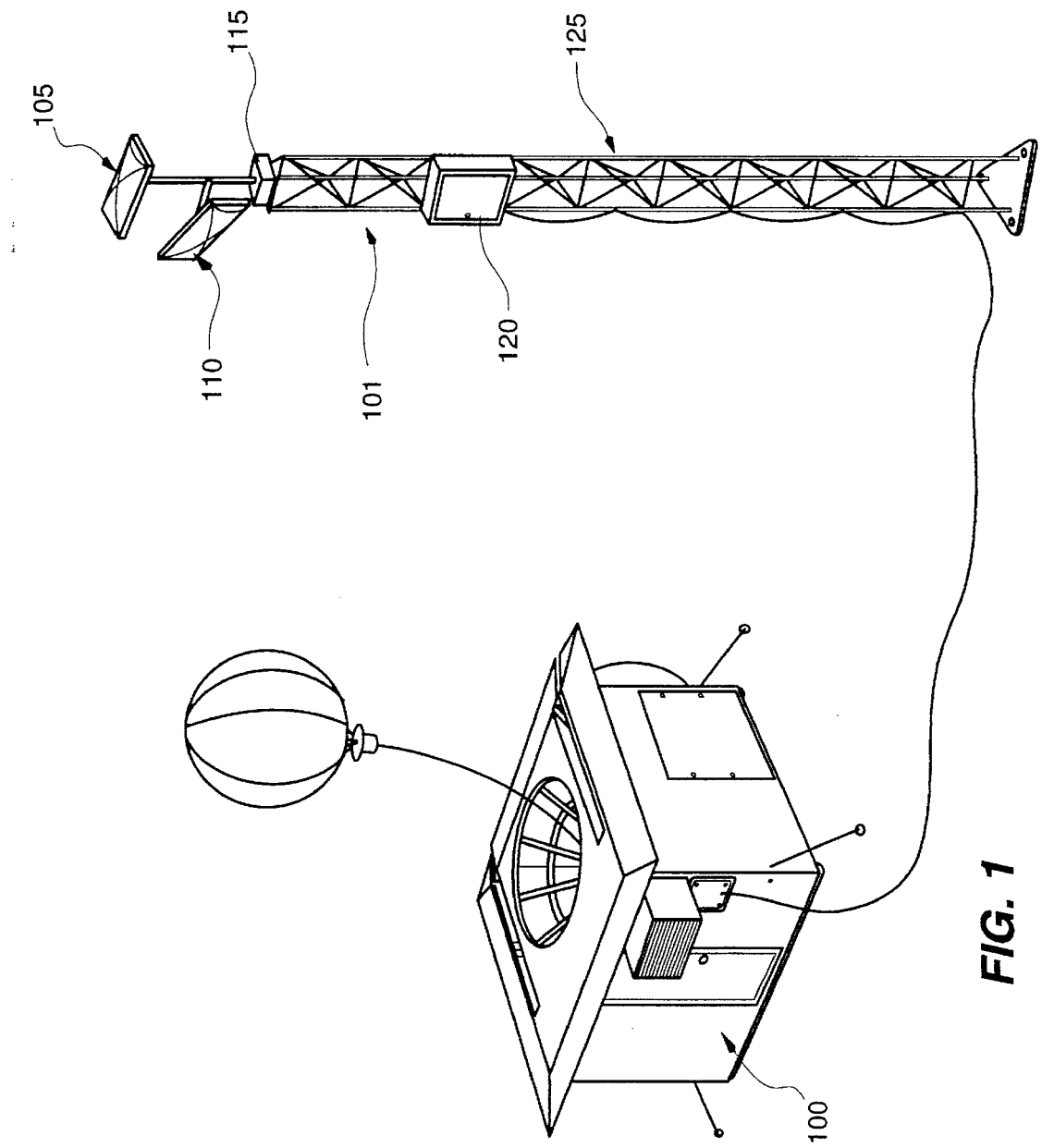
FIG. 1 illustrates the telemetry receiving system.

FIG. 1 illustrates the telemetry receiving system 101 for use in receiving telemetry from a wandering airborne atmospheric sounding device. In the preferred embodiment, the telemetry receiving system 101 is located near a sounding device deployment site, shown in FIG. 1 as a ground based deployment site 100 for use in deploying sounding devices tethered to balloons. Because balloon tethered sounding devices traverse the atmosphere by floating on the prevailing winds, a telemetry receiving system located near the deployment site is within range of the transmitter for the full sounding flight. Alternatively, the deployment site and telemetry receiving system may also be mounted on a mobile craft including, but not limited to, water vessels and aircraft as a matter of design choice. Key to optimal functioning, however, is that the telemetry receiving system be a high gain antenna located within transmitting range of the wandering sounding device until the sounding device traverses the maximum vertical distance through the atmosphere whether the device is ascending or descending. Occasionally, where the sounding device wanders down range beyond the sounding device's transmitting range more quickly than vertical distance is traversed, the transmitted signal simply becomes too weak to detect and subsequent data is lost.

In FIG. 1, an antenna tower 125 supports an antenna system comprising a configuration of two antennas 105 and 110 for use in receiving telemetry in the preferred embodiment. A platform 115 at the base of the antenna configuration 105 and 110 contains a rotor that azimuthally rotates the platform. Antennas 105 and 110 are mounted in fixed positions on platform 115 so that antenna 105 is oriented zenithally and antenna 110 is oriented horizontally relative to a virtual horizon. The virtual horizon is the earth's most distant horizon whether or not that horizon is actually visible due to physical obstructions in the immediate natural horizon at a given deployment site.

Controller box 120 contains assorted electronics and software necessary to control azimuthal rotor positioning on the platform 115, share a single receiver among antennas 105 and 110, amplify a received telemetry signal, and electronically beam sequence to observe signal strength and determine when to rotate the platform 115 to track the telemetry signal wherever it might wander. Electronic beam sequencing is the rapid directing of a receiving beam azimuthally a few degrees left and then a few right to sweep an area of space without physically moving the antenna. Signal amplification may be necessary depending on the strength of the signal received and the distance the signal must travel after being received in order to reach structure 100 for storing, processing, or subsequent transition to another site.

Shaped Receiving Pattern

Figure 2:
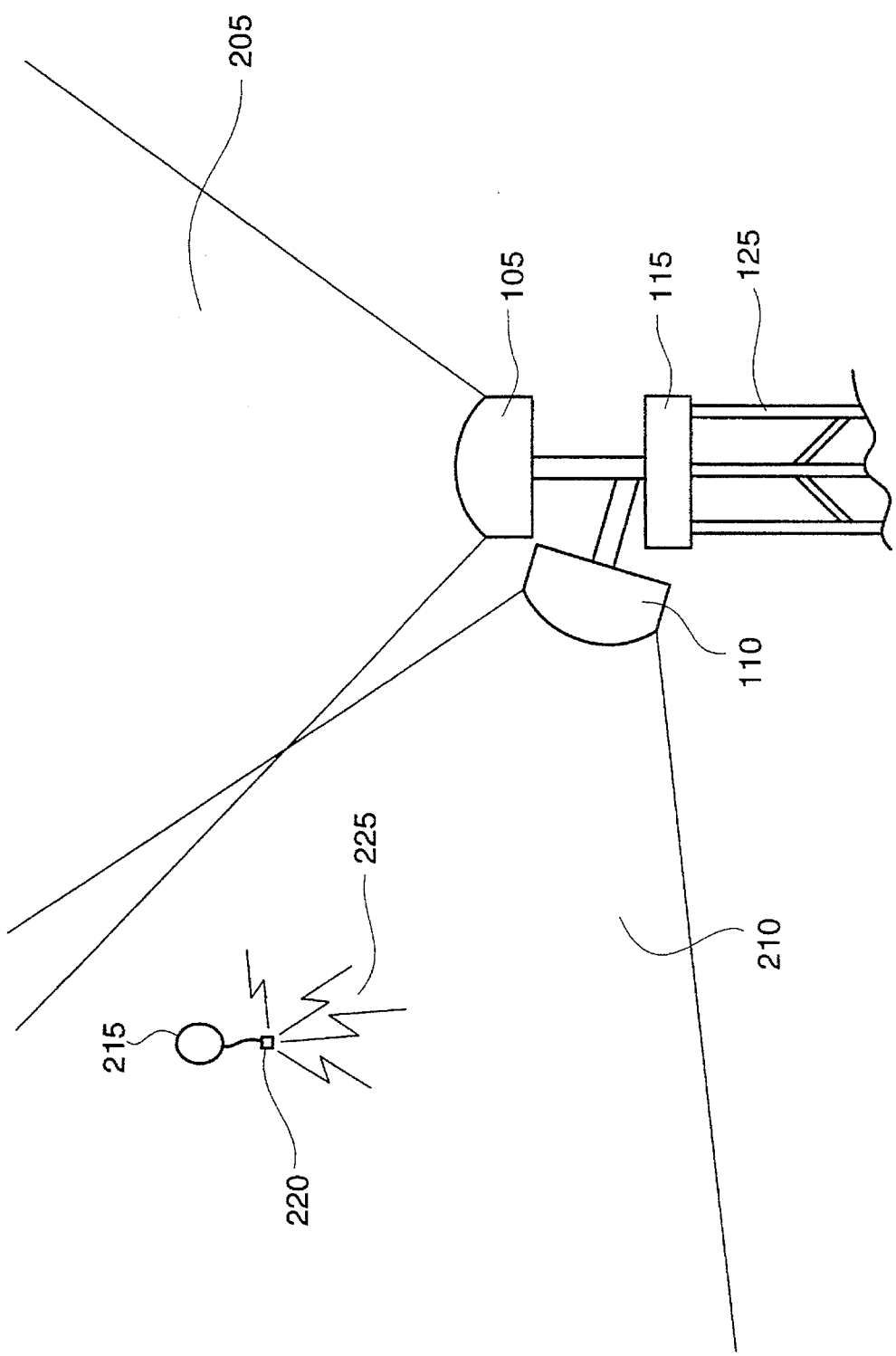
FIG. 2 illustrates a cross-sectional perspective of the antenna configuration and shaped receiving beam.
Figure 3:
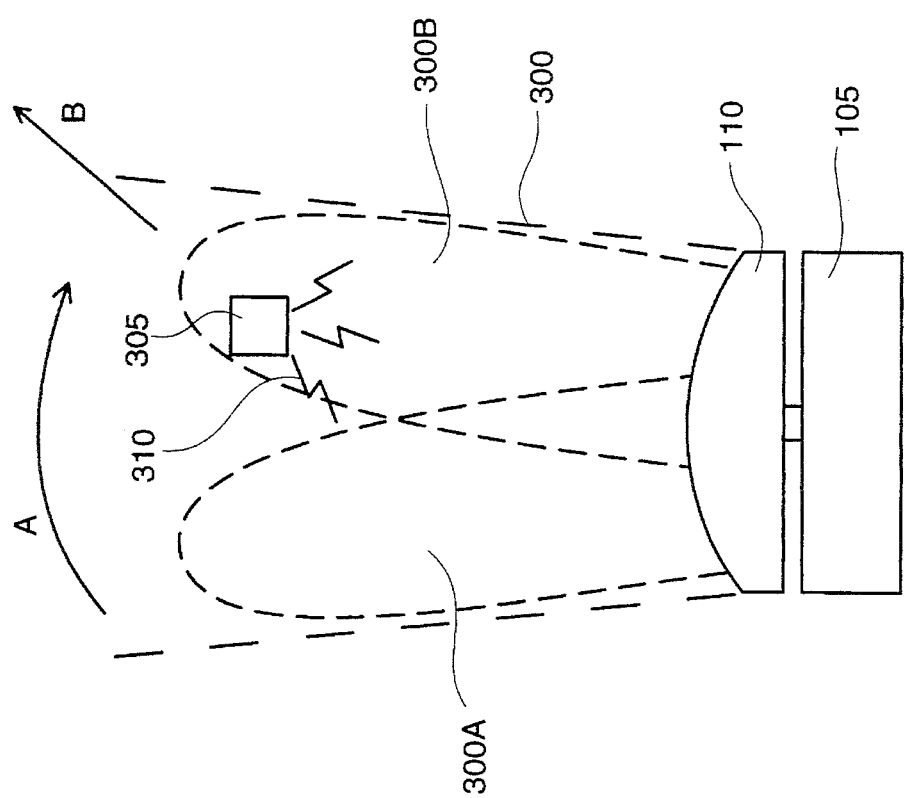
FIG. 3 illustrates a top down perspective of the antenna configuration and shaped receiving beam.

FIGS. 2 and 3 illustrate a shaped receiving beam having a high elevation and narrow azimuth. FIG. 2 illustrates a side perspective of antenna tower 124 supporting antenna configuration 105 and 110 mounted on the rotating platform 115. Antenna 110 is mounted at a low elevation for an elevational view of between or about 0 to 60 degrees elevation. Orienting antenna 110 at a low angle facilitates receiving a distant signal within the wide elevation of receiving beam 210. Antenna 105 also has a wide elevation receiving beam 205 that overlaps receiving beam 210 to provide full canopy coverage from the virtual horizon to zenith. Orienting antenna 105 at a high elevation toward zenith facilitates receiving a signal being transmitted from the overhead canopy within the elevation of receiving beam 205. Antennas 105 and 110 both share one receiver, and only the one antenna receiving the strongest signal 225 from the transmitter 220 tethered to balloon 215 is active at one time.

FIG. 3 illustrates a top down view of antenna configuration 105 and 110 and the narrow azimuth of shaped receiving beam 300. The width of shaped receiving beam 300 is between 5 to 25 degrees. The preferred azimuthal width is approximately 12 degrees. The total width of beam 300 results from electronic beam sequencing which is rapidly sequencing the receiving beam so that it sweeps azimuthally between position 300a to position 300b. The beam sequencing is electronically controlled and facilitates sensing the signal strength of telemetry signal 310 from a wandering transmitter 305, so that the antenna configuration can be rotated to keep the signal in the center of beam 300. Thus, electronic beam sequencing facilitates steering the antenna configuration. As illustrated in FIG. 3, a wandering transmitter 305 is crossing shaped receiving beam 300 in direction "B" so that the strongest telemetry signal 310 is being received when the receiving beam is sequenced to position 300b. As a stronger telemetry signal 310 is sensed in position 300b versus position 300a, the rotating platform 115 (not shown in FIG. 3) is instructed to rotate in direction "A" until the telemetry signal 310 is of equal strength as between beam position 300a and 300b. The continuous beam sequencing and azimuthal rotating facilitate tracking the wandering transmitter 305 without having to identify the actual transmitter location in three dimensional space.

Telemetry Receiving System In Operation

In the preferred embodiment where a sounding device is deployed using a balloon, antenna tower 125 is located within 50 to 250 feet of the deployment site 100. Immediately following deployment, antenna configuration 105 and 110 begin sensing for telemetry signal 310 to determine which antenna elevationally is receiving a stronger signal. Sensing elevationally is controlled electronically by the antenna controller in controller box 120 and the antenna receiver located in either the controller box 120 or shelter 100 occurs by alternating reception serially between antenna 110 and antenna 105 which are both connected to a single receiver. Only one antenna is active at a time so the single receiver switches between the antennas. Depending on which antenna is actively receiving the telemetry signal, that antenna concurrently beam sequences azimuthally within the azimuthal width of the receiving beam 300, to distinguish the signal strength of the telemetry signal 310 in the azimuth plane and to subsequently position the antenna configuration in the direction of the strongest signal as illustrated in FIG. 3. Beam sequencing and signal sensing is electronically controlled by the antenna controller in controller box 120 or separate from the antenna such as in shelter 100. In either case, determining the strongest signal direction facilitates activating the rotor to steer the antenna toward the strongest signal.

Where a strong signal cannot be located, the antenna configuration continues sensing for a signal as the azimuthally rotatable platform 115 rotates 360 degrees searching the full canopy. Alternatively, where a strong signal cannot be located, the antenna configuration can be manually positioned by inputting user originated commands to the positioning controller in control box 120 that controls the azimuthal rotor positioning in platform 115. Inputting user command is accomplished by a computer cabled to the control box 120 by any of several techniques well known in the computer communications art.

Antenna And Receiver Specifications

In the preferred embodiment, the antenna configuration 105 and 110 includes individual high gain, low frequency 1680 MHz microstrip patch array antennas. Key to shaping the receiving beam and distinguishing between the telemetry signal and noise, is that the antennas are high gain antennas. While one such antenna does not satisfactorily cover the entire overhead canopy, more than two such antennas may be used as a matter of design choice. Microstrip antennas can be fabricated by lithographic techniques and include printed circuit sensing arrays and high gain range which provides a thin profile, lightweight, inexpensive, and steerable antenna configuration. Microstrip antennas and the shared receiver for such antennas are well known in the art.

Summary

The low cost telemetry receiving system provides an inexpensive, steerable antenna configuration for receiving telemetry from a wandering transmitter. While specific embodiments of this invention are disclosed herein, it is expected that those skilled in the art can and will design alternate embodiments of this invention that fall within the scope of the following claims.

I claim:

1. A low cost telemetry receiving system for receiving a telemetry signal of predetermined frequency from a wandering transmitter in airspace local to said telemetry receiving system, said telemetry receiving system comprising:

high gain antenna means having a receiving beam of narrow azimuthal and wide elevational view of space;

means for sensing the strength of said telemetry signal; and means, responsive to said means for sensing, for positioning said antenna means to continuously receive said telemetry signal as said wandering transmitter traverses said airspace local to said telemetry receiving system.

2. The telemetry receiving system of claim 1 wherein said antenna means includes:

at least one microstrip patch array antenna; and a receiver connected in series to each said at least one microstrip patch array antenna.

3. The telemetry receiving system of claim I wherein said antenna means includes:

a first antenna being oriented zenithally; and a second antenna being oriented horizontally, wherein said first antenna and said second antenna are vertically polarized and provide said wide elevational view of space extending from virtual horizon to zenith.

4. The telemetry receiving system of claim 1 wherein said means for sensing includes:

first means for distinguishing the strength of said telemetry signal being received by a first antenna being oriented zenithally and a second antenna being oriented horizontally, said first antenna and said second antenna sharing said wide elevational view of space; and second means, concurrent with said first means, for distinguishing the strength of said telemetry signal being received, by azimuthally beam sequencing between a first side of said receiving beam and a second side of said receiving beam opposing said first side.

5. The telemetry receiving system of claim 1 wherein said means for positioning includes:

an azimuthally rotatable platform having said antenna means mounted thereon.

6. The telemetry receiving system of claim 1 wherein said means for positioning includes:

means, responsive to a user input command, for manually overriding said means for positioning responsive to said means for sensing.

7. A low cost telemetry receiving system for receiving a telemetry signal of predetermined frequency from a wandering transmitter in airspace local to said telemetry receiving system, said telemetry receiving system comprising:

antenna means having a first antenna and a second antenna;

a platform having said antenna means mounted thereon;

means for shaping a receiving beam of said antenna means whereby said first antenna is oriented zenithally and said second antenna is oriented horizontally in a shared vertical plane for a narrow azimuthal and a wide elevational view of space;

means for sensing the strength of said telemetry signal elevationally and azimuthally; and means, responsive to said means for sensing, for azimuthally rotating said platform to continuously receive said telemetry signal by way of said receiving beam of said antenna means as said wandering transmitter traverses said airspace local to said telemetry receiving system.

8. A method for receiving a telemetry signal of predetermined frequency from a wandering transmitter in airspace local to a telemetry receiving system, said method comprising the steps of:

mounting an antenna configuration on a platform;

shaping a receiving beam of said antenna configuration to have a narrow azimuthal and a wide elevational view of space;

sensing the strength of said telemetry signal; and positioning said antenna configuration to continuously receive said telemetry signal as said wandering transmitter traverses said airspace local to said telemetry receiving system, in response to said step of sensing.

9. The method of claim 8 including the step of:

connecting a receiver in series to each antenna in said antenna configuration.

10. The method of claim 8 including the steps of:

orienting a first antenna of said antenna configuration zenithally; and orienting a second antenna of said antenna configuration horizontally, whereby said first antenna and said second antenna are vertically polarized and provide said wide elevational view of space, said wide elevational view of space extending from virtual horizon to zenith.

11. The method of claim 8 including the steps of:

distinguishing the strength of said telemetry signal being received by a first antenna being oriented zenithally and a second antenna being oriented horizontally, where said first antenna and said second antenna share said wide elevational view of space; and concurrently distinguishing the strength of said telemetry signal being received, by azimuthally beam sequencing between a first side of said receiving beam and a second side of said receiving beam opposing said first side.

12. The method of claim 8 wherein said step of positioning includes the step of:

rotating said platform azimuthally.

13. The method of claim 8 including the step of:

positioning said platform in response to a user input command.

14. A method for receiving a telemetry signal of predetermined frequency from a wandering transmitter in airspace local to a telemetry receiving system, said method comprising the steps of:

mounting an antenna configuration on a platform;

shaping a receiving beam of said antenna configuration by orienting a first antenna zenithally and a second antenna horizontally in a shared vertical plane in a narrow azimuthal and a wide elevational view of space;

sensing the strength of said telemetry signal elevationally and azimuthally; and rotating said platform azimuthally to continuously receive said telemetry signal by way of said receiving beam of said antenna configuration as said wandering transmitter traverses said airspace local to said telemetry receiving system, in response to said step of sensing.

\* \* \* \* \*